(12) United States Patent
Corella et al.

(10) Patent No.: US 8,169,597 B2
(45) Date of Patent: May 1, 2012

(54) METHOD AND APPARATUS FOR LASER RETURN CHARACTERIZATION IN A COUNTERMEASURES SYSTEM

(75) Inventors: Armando Corella, Azusa, CA (US); John A. Carattini, Chino Hills, CA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 251 days.

(21) Appl. No.: 12/778,320

(22) Filed: May 12, 2010

(65) Prior Publication Data

US 2012/0068874 A1   Mar. 22, 2012

Related U.S. Application Data

(63) Continuation-in-part of application No. 12/080,157, filed on Mar. 31, 2008, now Pat. No. 7,830,499.

(60) Provisional application No. 60/920,713, filed on Mar. 29, 2007.

(51) Int. Cl.
*G01C 3/08* (2006.01)

(52) U.S. Cl. ........ 356/4.01; 356/3.01; 356/3.1; 356/4.1; 356/5.01; 342/14; 342/16

(58) Field of Classification Search ........ 356/3.01–3.15, 356/4.01–4.1, 5.01–5.15, 6–22, 28, 28.5, 356/139.01–139.1; 342/14–19
See application file for complete search history.

(56) References Cited

U.S. PATENT DOCUMENTS

| | | | |
|---|---|---|---|
| 6,343,766 B1 | 2/2002 | Livingston | |
| 6,359,681 B1 | 3/2002 | Housand et al. | |
| 6,643,000 B2 | 11/2003 | Fluckiger | |
| 6,992,778 B2 | 1/2006 | Nahum | |
| 7,378,626 B2 * | 5/2008 | Fetterly | 244/3.1 |
| 7,492,308 B2 | 2/2009 | Benayahu et al. | |
| 2004/0004707 A1 * | 1/2004 | DeFlumere | 356/4.01 |
| 2006/0197938 A1 | 9/2006 | Halmos et al. | |
| 2006/0232760 A1 | 10/2006 | Asbrock et al. | |
| 2007/0076481 A1 | 4/2007 | Tennant | |
| 2007/0201015 A1 | 8/2007 | Gidseg et al. | |
| 2007/0206177 A1 | 9/2007 | Anschel et al. | |

* cited by examiner

*Primary Examiner* — Luke Ratcliffe
(74) *Attorney, Agent, or Firm* — Daniel J. Long; Robert K. Tendler (57) ABSTRACT

In a method for laser return characterization in a DIRCM system, the improvement locating a single IR detector in an aperture in an image mirror so that its output can be used for countermeasure effectiveness measurement, missile range measurement, missile characteristic determination and to provide an AGC signal for tracking camera gain control.

14 Claims, 7 Drawing Sheets

METHOD AND APPARATUS FOR LASER RETURN CHARACTERIZATION IN A COUNTERMEASURES SYSTEM

CROSS REFERENCE TO RELATED APPLICATIONS

This application is a Continuation-in-Part of U.S. patent application Ser. No. 12/080,157 filed Mar. 31, 2008 and claims rights under 35 USC§119(e) from U.S. Patent Application Ser. No. 60/920,713 filed Mar. 29, 2007, the contents of which are incorporated herein by reference.

FIELD OF THE INVENTION

The present invention relates to countermeasures systems and more particularly to methods for of determining true "countermeasures effectiveness" in directed infrared countermeasures (DIRCM) systems.

BACKGROUND OF THE INVENTION

Countermeasures Effectiveness Assessment (CMEA) has been a major priority in the development of Directed Infrared Countermeasures (DIRCM) systems. The determination of when a threat is no longer lethal is a priority during multiple launches. The classification of a threat helps with determining jam code algorithms, the selection of jam codes or allows provisos for alternate deterrents. Conventional approaches use the existing fine-track-sensor; IR imaging camera, to detect the jam-laser optical return. However, the disadvantages of such conventional approaches include the need for additional processing, camera blanking, long integration times, lack of camera sensitivity, and asynchronous returns.

More particularly, heat seeking missiles are threats to both military and commercial aviation; and as missiles technologies evolve countermeasures have kept abreast with the introduction of directed infrared countermeasure systems. Unlike the older countermeasure systems the DIRCM defeats heat seeking missiles by confusing the seeker's electronics with a high intensity laser, one threat at a time. Heat seeking missiles, known as MANPADS (man-portable air-defense systems), are extremely fast and difficult to acquire, making "defeat" time-lines short and critical to assess.

The determination of when a threat is no longer lethal is a priority during multiple launches. Moreover, the classification of a threat helps with determining jam code algorithms, selection of jam codes or allows for the provision of alternate deterrents.

Countermeasures Effectiveness Assessment (CMEA) is the evaluation of how successful a threat has been thwarted. DIRCM's in the past relied on assessed defeat time or a missile-acquisition-warning (MAW) system to assess countermeasure effectiveness. However, both methods of CMEA are subjective and can cause critical time laps. Another prior method of determining CMEA is to use the existing DIRCM embedded camera commonly known as the fine-track-sensor, IR imaging camera, to detect jam-laser optical returns. Disadvantages of such an approach are outlined above. Moreover, using a DIRCM camera for determining CMEA or trying to characterize the approaching missile is more exacting than relying on an assumed defeat time.

SUMMARY OF INVENTION

The present invention is a method and apparatus for laser return characterization in a DIRCM system, wherein the improvement involves a single IR-detector mounted on the last optical stage of the DIRCM head. This single detector receives the laser return from the reticle of a missile and its output in and of itself permits CMEA determination. Note, since the missile's reticle has a limited field-of-view, if the countermeasure is effective there will be an Optical-Break-Lock (OBL) in which the missile's reticle is no longer looking at the aircraft. This is because the jamming radiation has caused the missile to go off course. When this occurs there are no laser return from the reticle, which means that the missile is no longer acquiring the aircraft. When the missile is no longer acquiring the aircraft the effectiveness of the countermeasure is 100%.

Thus, the primary use of the single detector is to detect when the missile's reticle is no longer redirecting jamming radiation impinging on the reticle back to the aircraft. When no return radiation is sensed it is concluded that the jamming was 100% effective and corresponds to a robust and rapid countermeasure effectiveness estimate. This method of CMEA/missile characteristic can be used for both split or shared path systems.

Secondly, the output of the detector can also be simultaneously used to determine missile characteristics.

Thirdly, the single IR detector is also a staring detector. As such, the staring detector can be used to detect background noise. Once having detected the background, an automatic gain control (AGC) circuit is used to adjust the gain of the camera used in tracking the missile.

Fourthly, another feature is using the output of the single detector for missile range determination. This is done by measuring the time between laser firing and the detection of the laser beam returned from the reticle of the missile.

BRIEF DESCRIPTION OF THE DRAWINGS

These and other features of the subject invention will be better understood in connection with the Detailed Description, in conjunction with the Drawings, of which.

DETAILED DESCRIPTION

Figure 1A:
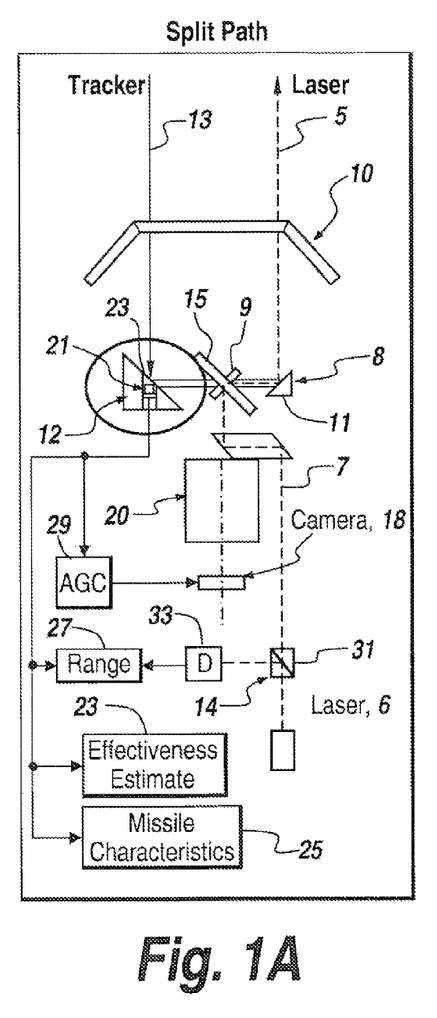
FIGS. 1A and 1B are respectively vertical cross section schematic views of a preferred split path and shared path embodiment of the apparatus of the present invention.

Referring to FIG. 1A, in a split path embodiment of the subject invention, in a tracker a laser beam 5 from a laser 6 follows a path 7 through an elevation arm 8 having a reflective element 9 and a laser pointing element 11 out through the dome 10 of a DIRCM head.

An image mirror 12 is mounted to elevation arm 8 and receives laser radiation reflected from an incoming missile's reticle along path 13. This incoming radiation is redirected by a reflector 15 utilizes optics 20. The camera in one embodiment is a focal plane array camera which is the tracking camera used in the tracker.

A single IR detector 21 is mounted beneath an aperture 23 in image mirror 12, with the output of detector 21 applied to an effectiveness estimation unit 23, a missile characterization processor 25, a range detection unit 27 and an automatic gain control circuit 29. As illustrated, the output of automatic gain control circuit 29 is applied to control the gain of camera 18.

A beam splitter 31 is employed to split off a portion of the beam from laser 6 to a detector 33 that is coupled to range determining unit 27 to be able to ascertain the range by the time difference between the outgoing laser pulse and the incoming reflected laser pulse as detected by detector 21.

Figure 1B:
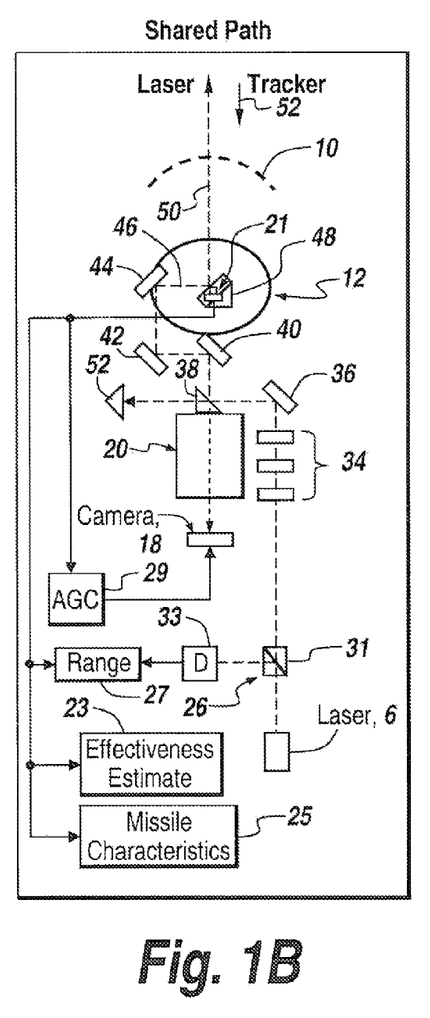

Referring to FIG. 1B, in a shared path application wherein like elements have like reference characters, the beam from laser 6 goes through beam splitter 31 and out through a number of filters 34 where the beam is redirected via a mirror 36 and a beam splitter 38 out around image mirror 12 utilizing reflectors 40, 42 and 44, whereupon the laser beam 46 is redirected via a laser beam positioning mirror 48 out along path 50 through dome 10.

The laser beam 52 reflected by the reticle of an incoming missile, impinges on mirror 48 and is redirected back through the system via mirrors 44, 42 and 40 and through splitter 38 and through optics 20 to camera 18. It will be noted that single detector 21 is located beneath mirror 48 in an aperture so that it functions similarly to detector 21 of FIG. 1A.

Note in the illustrated embodiment, a retro reflector 52 is used to provide a laser output image spot on camera 18.

What will be appreciated is that in each of the two embodiments, split path or shared path, a single detector is utilized to detect returns from the reticle of an incoming missile, with the output used in a number of ways to improve missile detection, characterization, ascertain range, and to ascertain the effectiveness of the countermeasure, as well as providing an automatic gain control signal to control tracking camera gain.

It will be noted that the difference between the single detector and the camera is that the camera is intended to track the oncoming missile with high fidelity. The majority of DIRCM community is trying to use the camera for multiple functions, but as indicated above the tracking of the missile takes most of its resources.

The location of this single infrared detector on the gimbal and more importantly on the elevation arm of the gimbal permits ready countermeasure effectiveness assessment. If the missile's reticle is locked on the aircraft and the DIRCM system is radiating the missile, the reticle will reflect laser energy back to the DIRCM system. The prior approach was contingent on the camera picking out the laser return through the entire target's clutter and atmospheric clutter.

If the laser jams the missile and obtains optical break lock, the reticle is no longer looking at the aircraft and the laser return goes away. The subject single infrared detector is uniquely capable of ascertaining when the laser return goes away.

Another function placed on the over-taxed camera is ranging. If the missile is acquired and the DIRCM is able to lase the missile, a single short burst from the laser is fired at the missile and the return is timed to calculate range.

All of the above functions can be accomplished through a single detector placed on the elevation arm under the receive mirror coaxial to the receive path. The use of the single detector, which is in essence a staring detector, is a function that the camera cannot accomplish. This is because the single detector is always staring, whereas the camera is not. The result is that the staring detector can also be used to assess background noise to additionally set the camera's automatic gain control.

Figure 2:
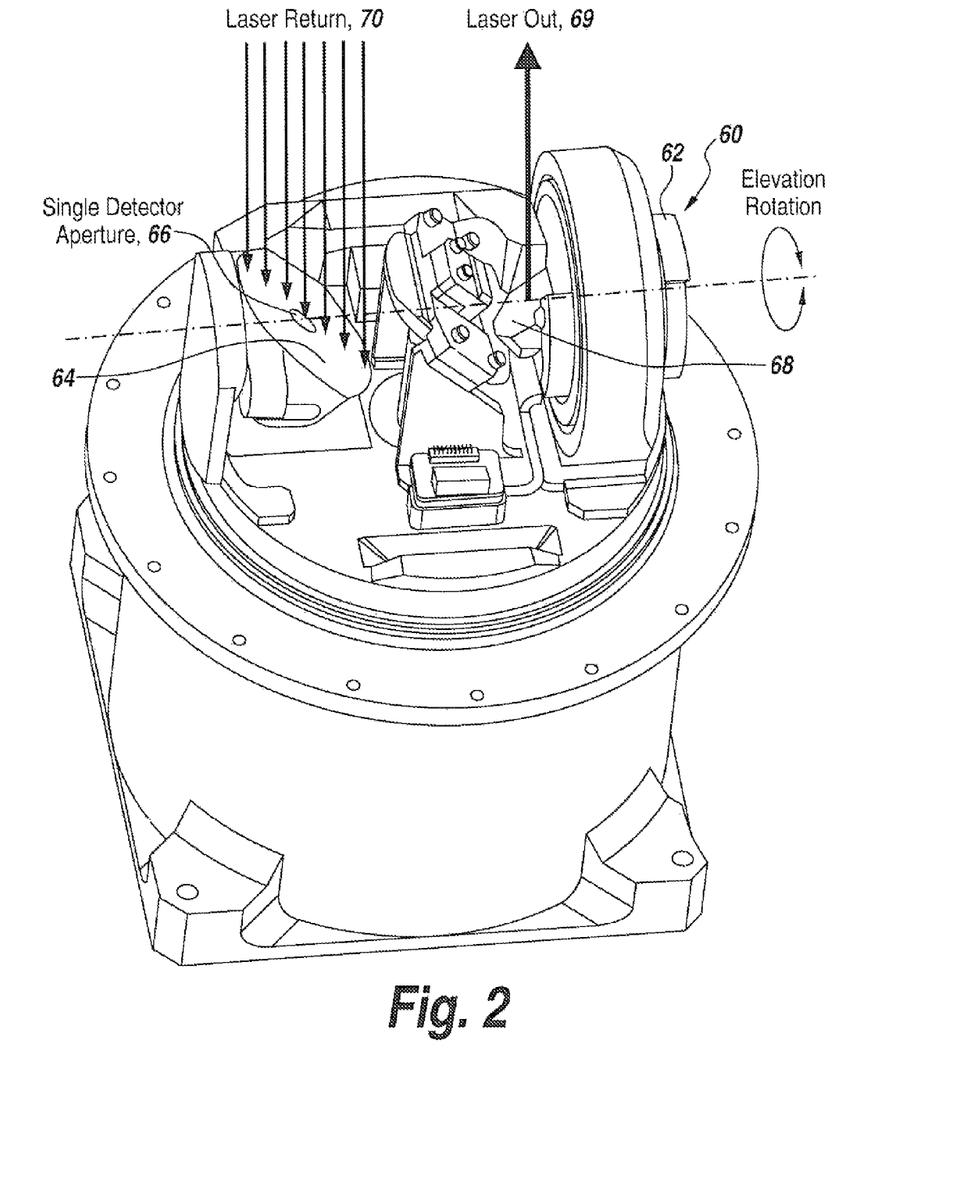
FIG. 2 is a diagrammatic illustration of a DIRCM gimbal assembly indicating laser return radiation hitting an image mirror on a elevation arm, showing a central aperture through which radiation passes to an embedded single detector.

More importantly and referring to FIG. 2, a gimbal 60 includes an elevation arm 62 having an image mirror 64 at one end thereof.

The gimbal includes an aiming mirror 66 which projects a laser beam 69 out of the gimbal. Laser returns 70 impinge on image mirror 64, with the mirror provided with an aperture 66 under which a single infrared detector is placed.

The majority of the returned radiation is redirected through the gimbal and to the tracking camera. However, a small portion of the incoming radiation which impinges on the aperture is passed through the aperture to the underlying or embedded IR detector.

Figure 3:
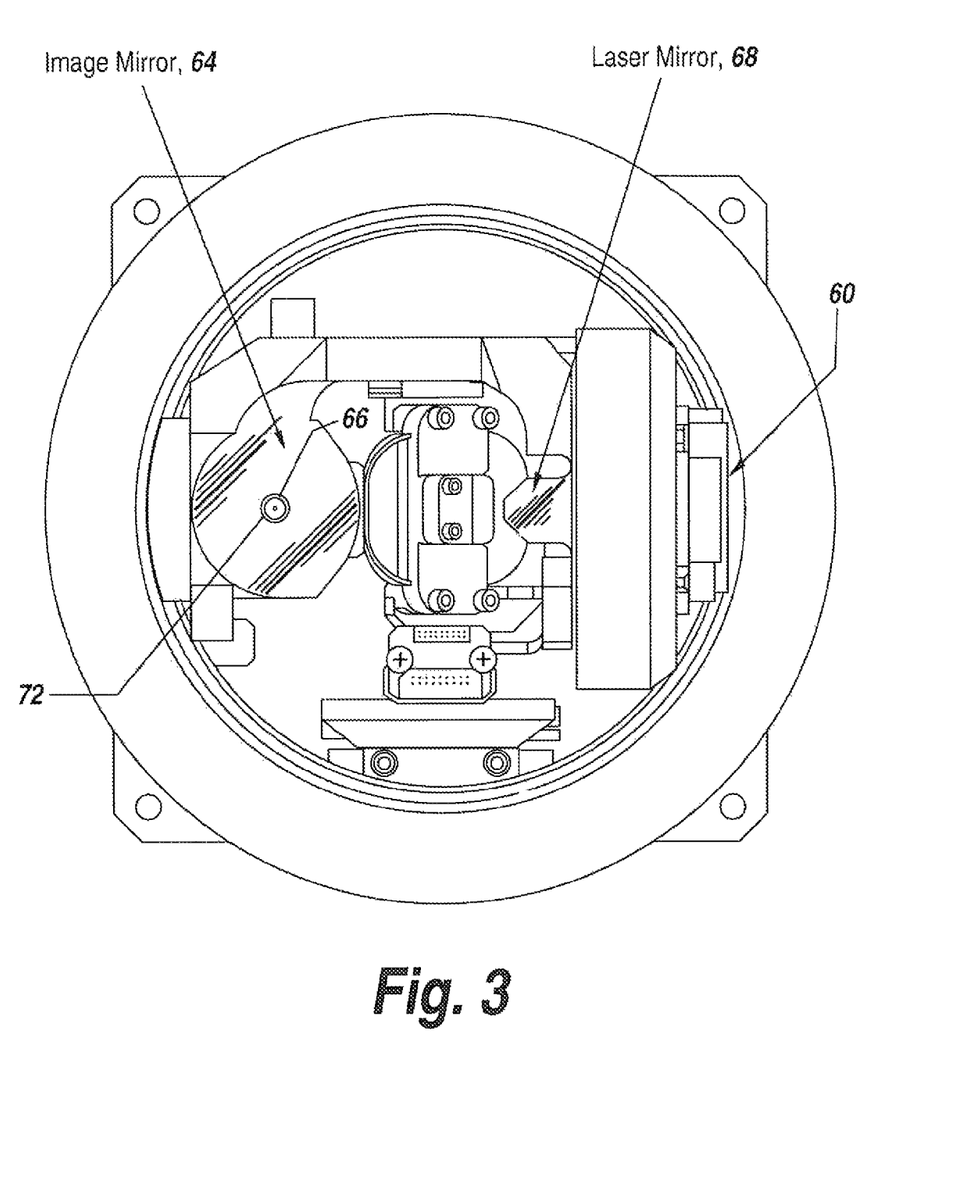
FIG. 3 is a top view of the gimbal of FIG. 2 showing the subject detector attached to the elevation arm beneath the central aperture in the image mirror.

Referring to FIG. 3, image mirror 64 is readily seen, along with aperture 66. What can be seen in aperture 66 is the face of an underlying infrared detector 72 that is exposed to returned laser radiation.

Figure 4:
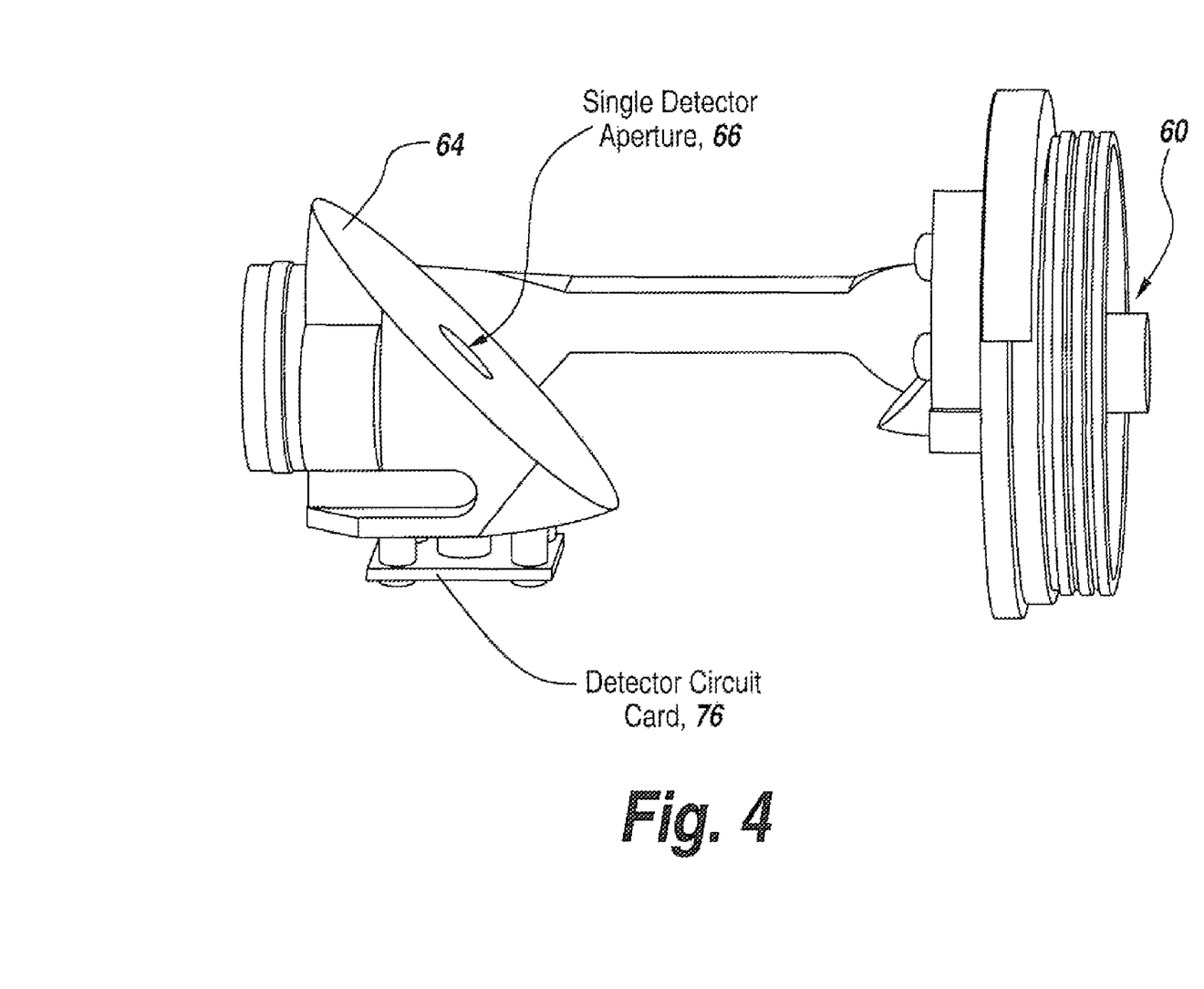
FIG. 4 is a diagrammatic illustration of the elevation arm of the gimbal in FIGS. 2 and 3, showing the single detector aperture and a detector circuit mounted therebeneath.

Referring to FIG. 4, elevation arm 60 is shown with single detector aperture 66 located through image mirror 64, also showing a detector circuit card 76 disposed at the bottom of the assembly holding the image mirror to the elevation arm.

Figure 5:
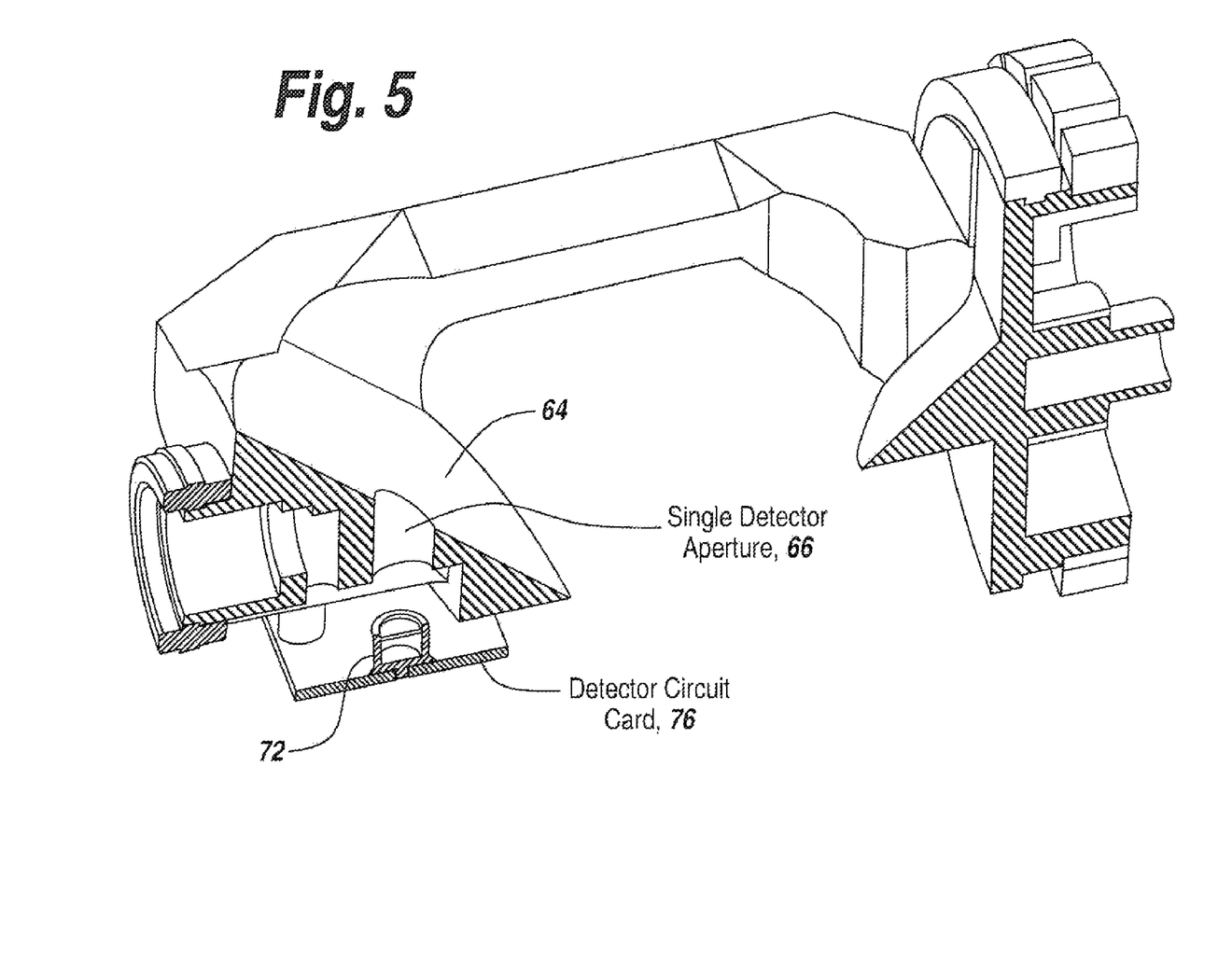
FIG. 5 is a diagrammatic and cut away view of the elevation arm of FIG. 4, showing the mounting of the single IR detector below the single detector aperture.

Referring to FIG. 5 in which like elements have like reference characters, the single detector aperture 66 is clearly shown in a cut away view, with detector 72 mounted on detector circuit card 76 such that incoming radiation passes through single detector aperture 66 on to detector 72.

Figure 6:
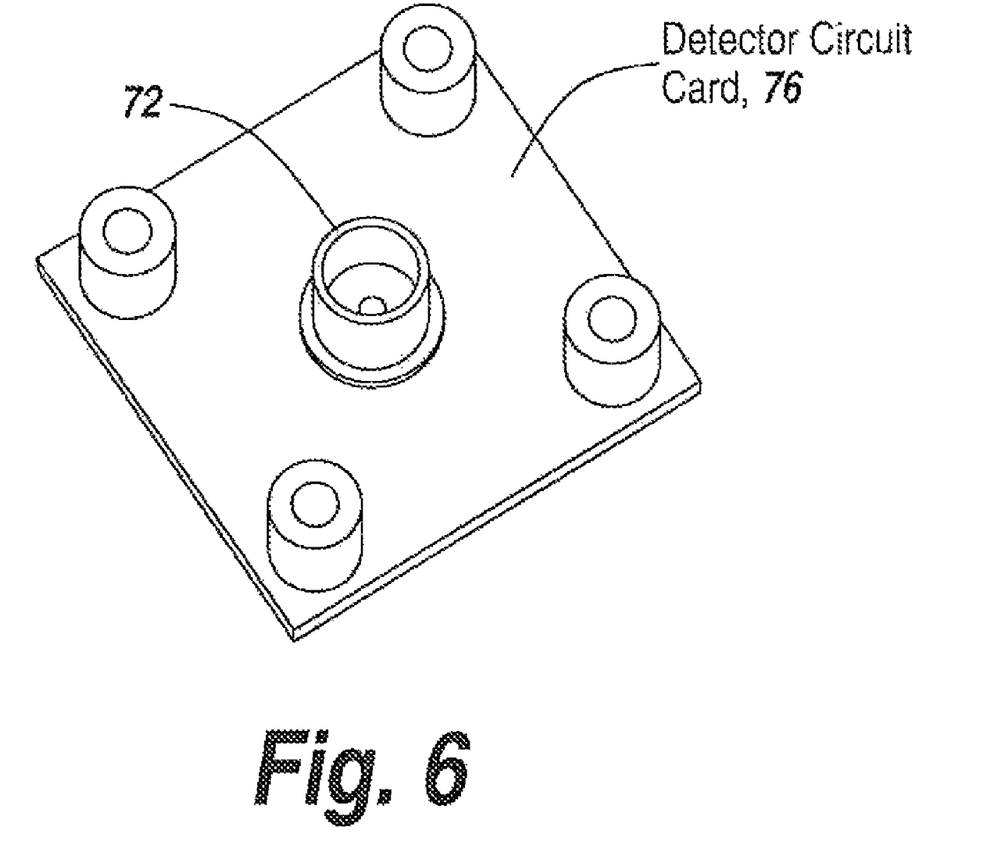
FIG. 6 is an isometric view of the circuit detector card of FIGS. 4 and 5.

Referring to FIG. 6, the detector circuit card 76 is illustrated in which detector 72 is mounted centrally and as will be explained is provided with a thermo-electric cooler to eliminate ambient noise. In one embodiment, the single detector is an indium phosphide detector with thermo-electric cooling.

Figure 7:
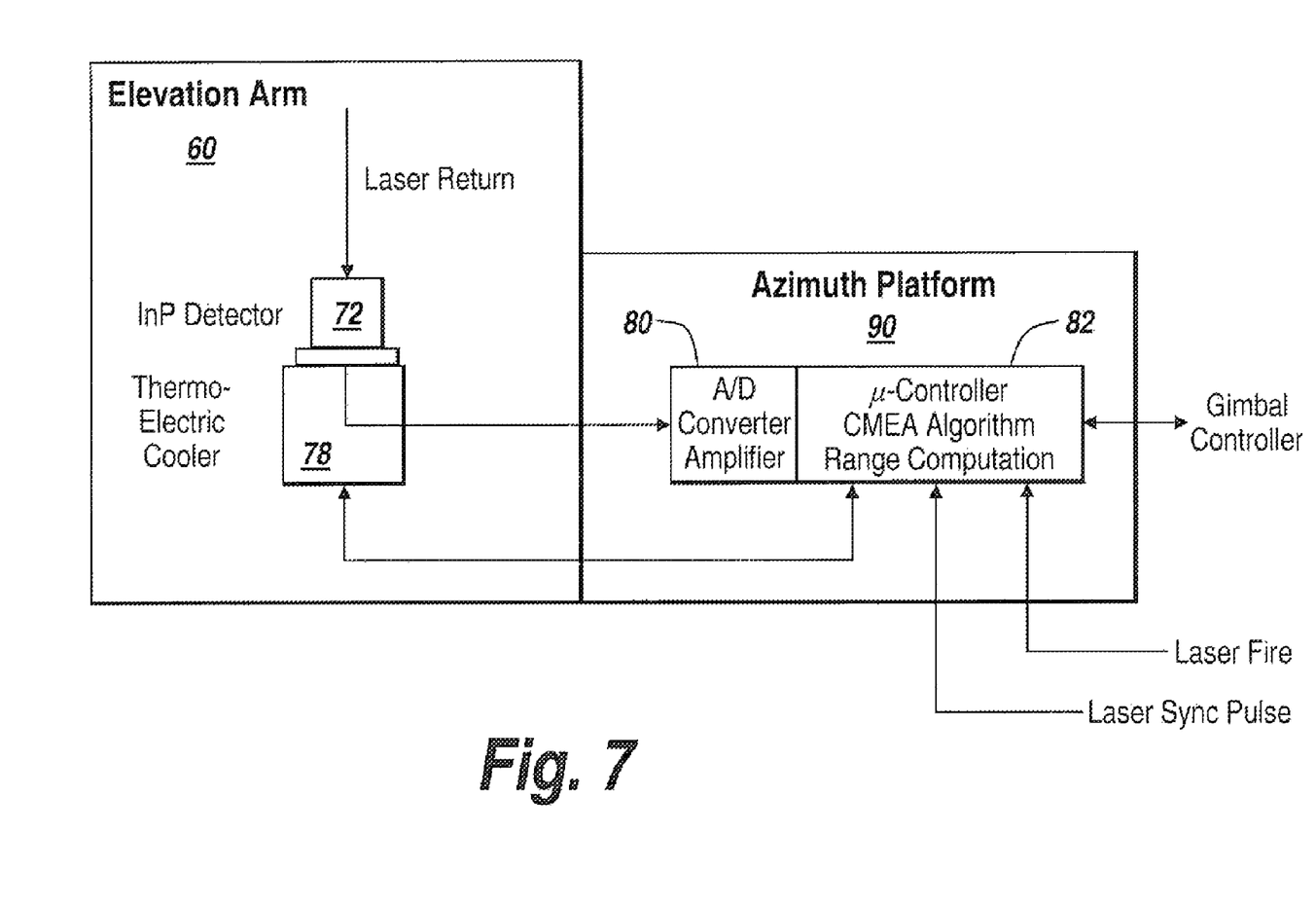
FIG. 7 is a block diagram of the subject single detector and follow on processing.

Referring now to FIG. 7, the indium phosphide detector 72 is shown mounted on elevation arm 60 and is provided with a thermo-electric cooler 78. The output of the detector is converted from analog to digital by an analog-to-digital converter and amplifier 80, which is then coupled to a microprocessor 82 that is provided with algorithms to provide effectiveness, range computation, missile characteristic detection and an automatic gain control function. It is noted that in one embodiment the analog-to-digital conversion and processing is done on the azimuth platform here illustrated at 90.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for determining laser return characteristics in a DIRCM system having a gimbal carrying an image mirror and a tracking camera, comprising the step of:

locating a single IR detector in an aperture in the image mirror; and, using the output from the single infrared detector for at least one of countermeasure effectiveness, missile range measurement, or missile classification determination, or for automatic gain control of the tracking camera.

2. The method of claim 1, wherein the gimbal has an elevation arm and wherein the image mirror is located on the elevation arm.

3. The method of claim 1, wherein the image mirror is used in a shared path system.

4. The method of claim 1, wherein the image mirror is used in a split path system.

5. The method of claim 1, wherein the single IR detector is provided with thermo-electric cooling.

6. The method of claim 1, wherein the single IR detector is a staring detector.

7. Apparatus for the improvement of laser return characterization in a DIRCM system having a laser, a tracking camera, a gimbal and an elevation arm mounted in said gimbal, comprising:
   an mirror having an aperture therethrough;
   a single infrared detector mounted so as to be exposed to radiation passing through said aperture; and,
   a countermeasure effectiveness module coupled to the output of said single infrared detector for ascertaining when radiation indicative of a return from the reticle of a missile is present and for when said radiation is not present thereafter, whereby a detector output indicative of no laser return radiation after the previous presence thereof is indicative of the employment of an effective countermeasure.

8. The apparatus of claim 7, and further including a missile characteristic determination module coupled to the output of said single infrared detector for deriving a characteristic of said missile based on the output from said single infrared detector.

9. The apparatus of claim 7, and further including a missile range determination unit coupled to the output of said single infrared detector and responsive to the firing of said laser for measuring the time difference between the firing and detected return for determining range of said missile.

10. The apparatus of claim 7, and further including an automatic gain control circuit coupled to the output of said single infrared detector for generating a gain control signal adapted to be applied to said tracking camera for the control of the gain thereof.

11. The apparatus of claim 7, wherein said single infrared detector is made from indium phosphide.

12. The apparatus of claim 7, and further including a thereto-electric cooling unit in contact with said single infrared detector for the removal of thermal noise therefrom.

13. A method for eliminating the burden on a tracking camera used in a DIRCM system to be able to ascertain at least one of countermeasure effectiveness, missile range measurement, and missile classification, or to provide automatic gain control of the tracking camera used by the DIRCM system, comprising the steps of:
   providing the DIRCM system with a gimbal that employs an image mirror; and,
   locating a single infrared detector at said image mirror so as to collect a portion of the energy returned to said DIRCM system due to the reflection of countermeasure radiation by the reticle of a missile, whereby the output of said single infrared detector may be used without affecting the operation of the tracking camera, thereby to unload the tracking camera from activities unrelated to tracking.

14. The method of claim 13, wherein the activities unrelated to tracking include at least one of countermeasure effectiveness, missile range measurement, missile classification determinations, or as an automatic gain control, of the camera.

\* \* \* \* \*